(12) United States Patent
Roba et al.

(10) Patent No.: US 6,336,347 B1
(45) Date of Patent: Jan. 8, 2002

(54) PROCESS FOR PRODUCING SILICA BY DECOMPOSITION OF AN ORGANOSILANE

(75) Inventors: Giacomo Stefano Roba, Monza; Marco Arimondi, Pavia, both of (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/472,145

(22) Filed: Dec. 27, 1999

Related U.S. Application Data

(60) Provisional application No. 60/117,225, filed on Jan. 26, 1999.

(30) Foreign Application Priority Data

Dec. 28, 1998 (EP) ............................................. 98830786

(51) Int. Cl.$^7$ ............................................. C03B 37/018
(52) U.S. Cl. ............................... 65/413; 65/414; 65/424
(58) Field of Search ........................... 65/413, 414, 424

(56) References Cited

U.S. PATENT DOCUMENTS

| 4,038,370 A | * | 7/1977 | Tokimoto et al. |
| 4,113,844 A | | 9/1978 | Tokimoto et al. |
| 5,043,002 A | | 8/1991 | Dobbins et al. |
| 5,078,092 A | | 1/1992 | Antos et al. |
| 5,707,415 A | | 1/1998 | Cain |
| 5,735,928 A | | 4/1998 | Sayce et al. |
| 5,904,952 A | * | 5/1999 | Lopata et al. |

FOREIGN PATENT DOCUMENTS

| DE | 40 26 371 | | 2/1992 | |
| EP | 622340 | * | 11/1994 | ................... 65/414 |
| GB | 2 071 644 | | 9/1981 | |
| WO | WO 97/22553 | | 6/1997 | |

* cited by examiner

Primary Examiner—Michael Colaianni
(74) Attorney, Agent, or Firm—Finnegan, Henderson, Farabow, Garrett & Dunner, L.L.P.

(57) ABSTRACT

A process for producing a high-purity optical silica preform, comprising (a) vaporization of an organosilicon compound; (b) thermal decomposition of the said organosilicon compound in the vapor state, to give amorphous fused silica particles; (c) deposition of the said amorphous fused silica particles on a support, in which the said organosilicon compound has the formula (I)

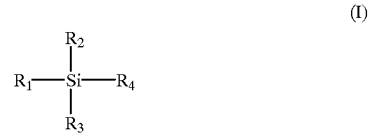

in which $R_1$, $R_2$, $R_3$ and $R_4$ have the meanings given in the text.

19 Claims, 2 Drawing Sheets

PROCESS FOR PRODUCING SILICA BY DECOMPOSITION OF AN ORGANOSILANE

This application is based on European Patent Application No. 98830786.4 filed on Dec. 28, 1998 and U.S. Provisional Application No. 60/117,225 filed on Jan. 26, 1999, the content of which is incorporated hereinto by reference.

The present invention relates to the process for producing silica by decomposition of an organosilane.

More particularly, the present invention relates to a process for producing an optical preform of silica by decomposition of an organosilicon compound of formula (I), as indicated later.

Many processes for producing metal oxides by decomposition of suitable reagents in the vapour state are known in the prior art. In general, these processes require a feed solution containing the metal compound whose oxide it is desired to obtain, means for evaporating the said solution, means for conveying the vapours obtained, oxidizing means or combustion means. A mixture of finely divided spherical aggregates referred to as "soot" is thus obtained, which can be collected in various ways.

Among the said processes for producing metal oxides, the ones of particular interest are those relating to the production of high-purity silicon dioxide, or silica ($SiO_2$). This high-purity requirement is particularly essential when the silica is used in highly sophisticated sectors such as, for example, the production of semiconductors and optical fibres. The reason for this is that it is well known that, in order for an optical fibre to be able to ensure high-quality transmission of the optical signals, i.e. a low level of attenuation, the silica of which it is composed must have a very high degree of purity.

According to one method for producing optical fibres, the soot is deposited onto a horizontally rotating bar, while the burner, and thus the flame, translates cyclically (outside vapour deposition; OVD) or else on a bar which rotates and moves vertically, while the burner, and thus the flame, remains fixed at the lower end of the bar (vapour axial deposition; VAD). Typically, the said bar (mandrel) is cylindrical and is made of high-purity glass. After the desired amount of soot has been deposited, the central bar is removed and roughcast thus obtained is heated, dehydrated and solidified. The component thus obtained is known as a "preform", and an optical fibre is then drawn therefrom by means of a suitable device which works under controlled conditions of melting point, tension, speed and diameter of the fibre.

The industrial method used for many years to produce high-purity silica is based on the decomposition of silicon tetrachloride ($SiCl_4$), but this decomposition has the drawback of entailing the formation of toxic and corrosive gaseous by-products such as chlorine ($Cl_2$) and hydrochloric acid (HCl). A plant for producing silica by this method must therefore be adequately fitted with devices for cutting down the said toxic gases, and requires constant maintenance with substantial increase of the costs.

These drawbacks have directed research towards halogen-free materials.

U.S. Pat. No. 5,043,002 gives a review of various halogen-free organosilicon compounds. According to that document, among all halogen-free organosilicon compounds, those which are most suitable for producing high-purity silica are the siloxanes and, among all the siloxanes investigated, the most suitable proved to be octamethylcyclotetrasiloxane ($-[SiO(CH_3)_2]_4-$).

Experiments carried out by the inventors of the present invention have found, however, that the high boiling point (175° C.) of octamethylcyclotetrasiloxane (OMCTS) causes serious drawbacks such as, for example:

a) the need to heat the feed conduits to a temperature >175° C. in order to avoid local condensations of OMCTS. This requirement creates considerable difficulties since no apparatus currently exists which is capable of measuring the flow rate of a vapour at a temperature above 130–140° C. Thus, it is necessary to measure the flow rate of liquid OMCTS upstream of the bubbling device. However, measuring the compound in the liquid phase does not allow an accurate control of the actual amount of vapour subsequently formed in the bubbling device per unit of time and this does not allow stabilization of the system by means of controlling the flow rates;

b) the need for specific evaporation systems such as, for example, a flash vaporizer of the type described in U.S. Pat. No. 5,078,092 or the film evaporator described in U.S. Pat. No. 5,707,415;

c) the thermal decomposition of the OMCTS, while passing through the feed conduits, into non-volatile polymer residues which are deposited in the conduits and thus block them. Besides generating the said residues, the said thermal decomposition also has an adverse effect on the optical quality of the preform obtained.

These and other drawbacks associated with the use of polyalkylsiloxanes in the vapour state are also described in patent application WO 97/22553, which reports that, during the feeding of polyalkylsiloxanes, in the vapour state, into the burner, high-molecular-weight species are deposited, in the form of gel, in the line which conveys the reagents into the burner or in the burner itself. This leads to a reduction in the speed of deposition of the "soot" preform and also to imperfections which produce defective or unusable optical fibres (from page 7, line 33 to page 8, line 7). In another passage of that document, it is pointed out that the abovementioned formation of deposits in gel form is due to high-boiling impurities present in the polyalkylsiloxanes and that the formation of these deposits hinders the control and reproducibility of the process. This problem is all the more serious when an oxidant carrier gas, such as oxygen, is present in the flow of the polyalkylsiloxane vapour, since the oxidants can catalyse the polymerization of the polyalkylsiloxane (from page 9, line 26 to page 10, line 18).

It has now been found, surprisingly, that an organosilicon compound of formula (I), as shown later, comprising at least two silicon atoms and containing no oxygen atoms, does not have, in the vapour state, the abovementioned drawbacks. To be specific, this gives a silica of high purity with high yields of deposition and requires very simple, inexpensive and easy-to-maintain apparatus.

This is all the more surprising when one considers that the use of silane was not recommended on account of the violence of its combustion reaction (U.S. Pat. No. 5,043,002, column 2, lines 25–36). The Applicant has moreover observed that a silane compound free of oxygen but containing a single silicon atom (in particular tetramethylsilane) has a series of drawbacks associated with the difficulties in managing and controlling the combustion reaction, which make it complicated to use as a reagent for producing silica. It has moreover been observed that this compound, under normal process conditions, forms silica particles of small diameter, while the silica deposited is of low density. These two combined phenomena give rise to a vitreous mass which is too fragile for the subsequent treatments required to obtain an optical preform.

A first aspect of the present invention thus consists of a process for producing a high-purity optical silica preform, comprising a) vaporization of an organosilicon compound;
b) thermal decomposition of the said organosilicon compound in the vapour state, to give amorphous fused silica particles;
c) deposition of the said amorphous fused silica particles on a support; and characterized in that the said organosilicon compound has the following formula

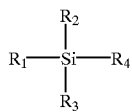
(I)

in which $R_1$, $R_2$ and $R_3$ are each, independently, hydrogen, methyl, ethyl, propyl, isopropyl or a group of formula —Si—($R_5R_6$ $R_7$), where $R_5$, $R_6$ and $R_7$ are each, independently, methyl, ethyl, propyl or isopropyl, and $R_4$ is a group of formula —$(CH_2)_m$—Si—($R_5R_6$ $R_7$), where $R_5$, $R_6$ and $R_7$ are as defined above and m is an integer between 0 and 3.

Preferably, at least two of the groups $R_1$, $R_2$ and $R_3$ are other than hydrogen. Among these compounds, the ones which are preferred are those which are liquid at room temperature, those with a boiling point of less than about 140° C., preferably between about 70° C. and about 140° C., being particularly preferred.

Examples of compounds of formula (I) are:

$(CH_3)_3$—Si—Si—$(CH_3)_3$ (hexamethyidisilane)
$[(CH_3)_3$—Si$]_3$—Si—H (tris(trimethylsilyl)silane)
$(CH_3)_3$—Si—$CH_2$—Si—$(CH_3)_3$ (bis(trimethylsilyl)methane)

Preferably, the compound of formula (I) is hexamethyldisilane.

The present invention will be further described with the aid of FIGS. 1, 2 and 3, in which.

Figure 1:
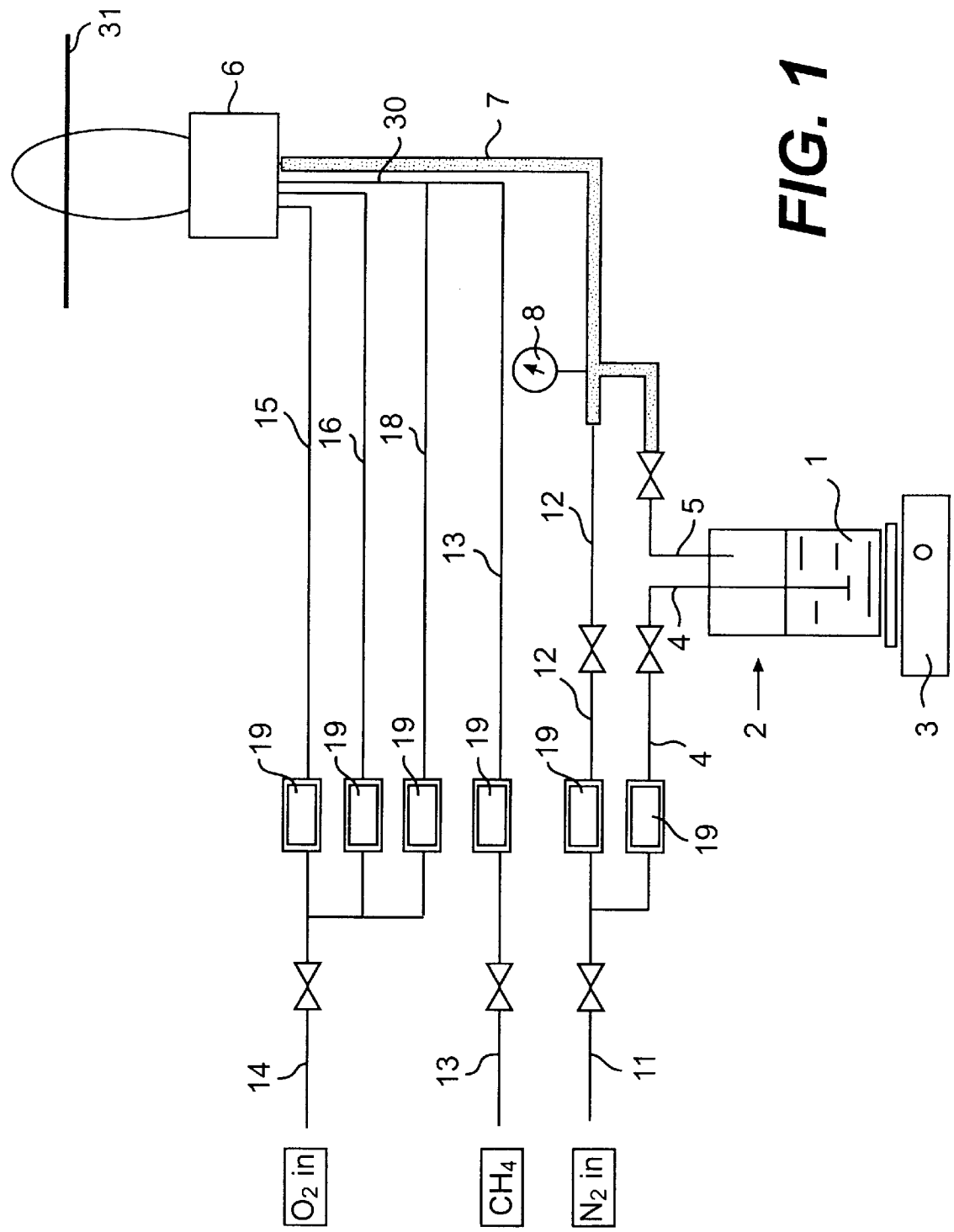
FIG. 1 represents a schematic view of a plant which can be used to carry out the process of the present invention.

With reference to FIG. 1, the organosilicon compound of formula (I) is preferably entrained by an inert gas such as, for example, nitrogen. For example, the carrier gas can be bubbled into a container (2) containing the compound of formula (I) in liquid form. The mixture of the carrier gas containing the vapours of the compound (I) is then preferably heated in the pipe (5) to a temperature above the boiling point of the compound (I), and conveyed into the burner (6) via the pipe (7). Optionally, the mixture of carrier gas and compound of formula (I) can be diluted, by addition of further inert gas originating from the pipe (12), in order to allow better control of the combustion process.

The compound of formula (I) is advantageously vaporized at a temperature above the boiling point of the said compound, preferably between 30 and 140° C., even more preferably between 50 and 130° C., and at a partial pressure of between 0 and 3 bar, even more preferably between 0.1 and 1 bar.

Typically, the thermal decomposition of the compound of formula (I) takes place in the presence of oxygen, by means of a combustion reaction of this compound.

Phase b) can be carried out by direct combustion of the compound of formula (I) with oxygen, preferably in excess, essentially in the absence of combustible gases. Preferably, the molar ratio between the oxygen and the compound (I) is between about 5 and about 20.

However, according to a preferred embodiment, phase b) is carried out in the presence of a combustible gas (for example methane) and an excess of oxygen.

Typically, the gas is methane and the methane/compound of formula (I) molar ratio ranges from 0.1 to 10.

Preferably, the temperature of the flame is between 1300 and 3500° C. and even more preferably between 1600 and 3100° C.

Advantageously, the support mentioned in phase c) is a high-purity quartz cylindrical body.

Preferably, the said support is aligned horizontally relative to the ground and rotates at a speed of between 0 and 100 rpm and even more preferably at between 20 and 60 rpm.

Figure 3:
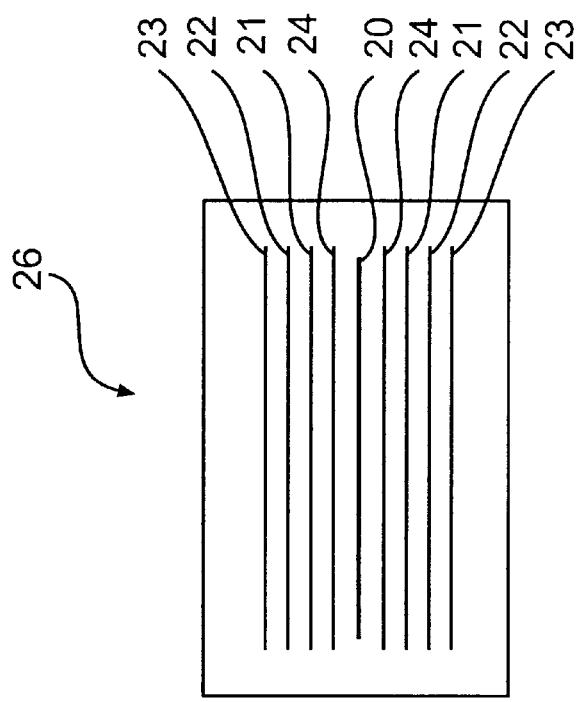
FIG. 3 is a schematic top view of a variant of the burner illustrated in FIG. 2.
Figure 2:
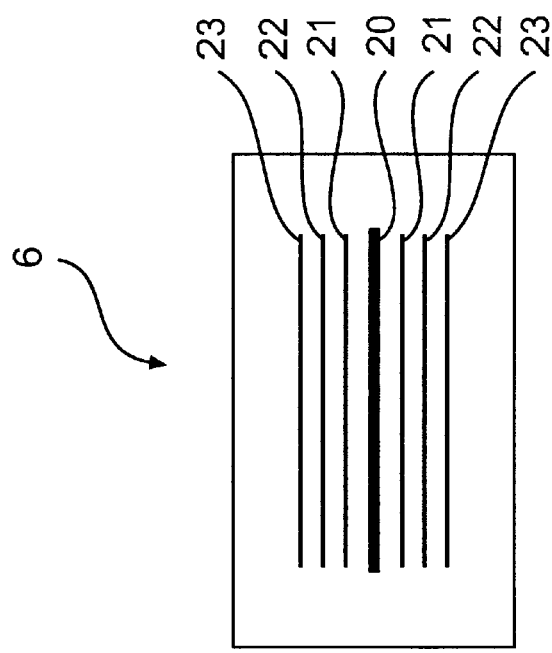
FIG. 2 is a schematic top view of a burner with slits which can be used in the plant illustrated in FIG. 1.

A flame burner such as, for example, those illustrated in FIG. 2 or FIG. 3 can be used to carry out the deposition.

The burner (6) in FIG. 2 is of linear type and comprises a central slit (20) and three pairs of lateral slits (21, 22, 23), each about 50 mm long. The central slit (20) is normally fed with the flow of vaporized compound of formula (I), optionally mixed with the carrier gas (for example nitrogen) originating from the conduit (7). The first pair of lateral slits (21) is typically fed with oxygen originating from a pipe (16), while the second pair of lateral slits (22) is normally fed, for example, with methane which is preferably premixed with oxygen, originating from a pipe (30). In turn, the methane gas fed into the pipe (30) originates from a pipe (13), while the oxygen originates from a pipe (18). The outer pair of lateral slits (23) is optional and can be fed with additional oxygen originating from a pipe (15).

The pipes (4, 5, 11, 12, 13, 14) are fitted with an opening/closing valve and the pipes (4, 12, 13, 18, 16, 15) are fitted with a flow control device (19).

The burner (26) represented in FIG. 3, compared with the one in FIG. 2, is provided with an additional pair of lateral slits (24). The plant (not illustrated) which uses the burner (26) is similar to the one in FIG. 1, except for the fact that it is equipped with suitable conduits which convey nitrogen gas to the abovementioned pair of lateral slits (24). The presence of this pair of lateral slits (24) prevents the formation of silica on the walls of the central slit (20), caused by the diffusion of oxygen through the pair of lateral slits (21) and by the rapid combustion reaction of the compound of formula (I).

Generally, at the end of the deposition process, the preform thus obtained is dehydrated and solidified, thus obtaining the final solid, compact preform. This phase is typically carried out in an electric furnace at a temperature of between 1000 and 1600° C. and even more preferably between 1200 and 1600° C., according to known techniques.

With reference to the organosilicon compound of formula (I), in particular hexamethyidisilane, it will be readily understood by a person skilled in the art that this compound can also be used in other processes which use variants of the process of the present invention, for example, in processes in which the hexamethyldisilane is decomposed by hydrolysis or flame pyrolysis or in which a different system for collecting or a different system for depositing the silica is used, in particular in the abovementioned VAD deposition technique.

A person skilled in the art will also appreciate that the silica articles prepared according to the present invention can be doped with various metals in order to modify their physicochemical properties by known techniques. For example, the said silica articles can be doped, depending on the case, with aluminium oxide, boron oxide, germanium oxide, phosphorous oxide and titanium oxide, or mixtures thereof.

EXAMPLE 1

As shown in FIG. 1, hexamethyldisilane (1) ($T_{bp}$=113° C.) was loaded into a bubbling device (2) with a porous septum, immersed in a thermostatically controlled bath heated by the heater (3) to an internal temperature of 50° C., controlled by a contact thermometer such as a Vertex thermometer.

The bubbling device (2) was also fitted with an inlet pipe (4), for the addition of nitrogen gas, dipped into the liquid hexamethyidisilane, and an upper outlet pipe (5) for conveying the flow of nitrogen gas and hexamethyidisilane vapours to a burner (6). The nitrogen was conveyed into the bubbling device (2) at a flow rate of about 5 l/min.

The nitrogen originating from a conduit (11) was conveyed not only into the bubbling device (2), but also in a pipe (12) connected to the outlet pipe (5) from the bubbling device (2), with a flow rate of about 4.4 l/min. The flow of nitrogen originating from the pipe (12) and the flow of nitrogen and of hexamethyidisilane vapours originating from the pipe (5) were combined and conveyed in a conduit (7) which carried it to the burner (6), with a total flow rate of about 10.4 l/min.

The pressure of the flow of nitrogen originating from the pipe (12) and of the flow of nitrogen and of hexamethyidisilane vapours originating from the pipe (5) were checked by a manometer (8) and maintained at about 1 bar.

The outlet pipe (5) from the bubbling device (2) and the conduit (7) were heated to about 130° C.

With reference to FIG. 2, the burner (6) was of the linear type formed of a central slit (20) and two pairs of lateral slits (21, 22), each about 50 mm long (the optional slit 23 was not used). The central slit (20) was fed with the flow of hexamethyidisilane and nitrogen originating from the conduit (7), the first pair of lateral slits (21) were fed with oxygen originating from a pipe (16) with a flow rate of about 24 l/min, while the second pair of lateral slits (22) was fed with a mixture of methane gas (16 l/min) and oxygen (11 l/min) originating from a pipe (30). In turn, the pipe (30) was fed with methane gas originating from a pipe (13) and with oxygen originating from a pipe (18).

The pipes (4, 5, 11, 12, 13, 14) were fitted with an opening/closing valve and the pipes (4, 12, 13, 18, 16, 15) were fitted with a device (19) for controlling the flow.

The flame of the burner (6) decomposed the hexamethyidisilane at a temperature above 1500° C. and generated a flow of fused silica particles which was sent to a horizontal cylindrical support (31) rotating at a speed of 50 rpm, consisting of a quartz bar (20 mm in diameter).

The flame cone proved to be fully controllable and contained, thus giving a high yield of deposited silica.

Microstructural analysis of the particles deposited ("soot") showed that they consisted of aggregates of spherical particles with sizes of from 0.06 to 0.3 µm.

The density of the mass of silica deposited was about 0.4 g/cm³. This was thus optimal for the subsequent passages (extraction of the mandrel and manageability during the treatments required for the preparation of a preform).

Comparative Example 1

The process was performed in a similar manner to that described in Example 1 above, except that tetramethylsilane was used instead of hexamethyidisilane and the conditions of the various phases were modified slightly to adapt them to the lower boiling point of the tetramethylsilane.

Specifically, the tetramethylsilane was brought to the vapour state at a temperature of 25° C. and a pressure of 1 bar and this vapour was conveyed from the bubbling device to the burner without the addition of a carrier gas (nitrogen).

However, whereas the abovementioned phases of evaporation and transportation of the vapour required milder conditions than those in Example 1, the high calorific value and the high flammability of tetramethylsilane (flashpoint– 27° C.) required, in the subsequent decomposition phase, the implementation of the typical safety measures for extremely flammable substances.

The microstructural analysis of the particles deposited ("soot") showed that they consisted of small aggregates of particles with sizes within the range between 0.03 and 0.1 µm.

The density of the mass of silica deposited was about 0.2 g/cm³.

The small particle size and the low density of the silica obtained gave rise to a mass which was too fragile for the subsequent treatments required to obtain a preform.

What is claimed is:

1. Process for producing a high-purity optical silica preform, comprising
    a) vaporization of an organosilicon compound;
    b) thermal decomposition of the said organosilicon compound in the vapour state by a combustion process to give amorphous fused silica particles;
    c) deposition of the said amorphous fused silica particles on a support to form the high purity optical silica preform; and characterized in that
the said organosilicon compound has the following formula

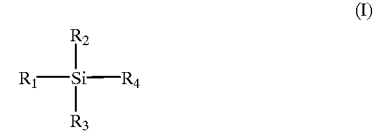

(I)

in which
    $R_1$, $R_2$ and $R_3$ are each, independently, hydrogen, methyl, ethyl, propyl, isopropyl or a group of formula —Si—($R_5$ $R_6$ $R_7$), where $R_5$, $R_6$ and $R_7$ are each, independently, methyl, ethyl, propyl or isopropyl, and
    $R_4$ is a group of formula —$(CH_2)_m$—Si—($R_5$ $R_6$ $R_7$), where $R_5$, $R_6$ and $R_7$ are as defined above and m is an integer between 0 and 3.

2. Process according to claim 1, characterized in that at least two of the groups $R_1$, $R_2$ and $R_3$ are other than hydrogen.

3. Process according to claim 1, characterized in that the said compound is liquid at room temperature.

4. Process according to claim 1, characterized in that the said compound has a boiling point of less than about 140° C.

5. Process according to claim 1, characterized in that the said compound has a boiling point of between about 70° C. and about 140° C.

6. Process according to claim 1, characterized in that the said compound is chosen from the group comprising hexamethyldisilane, tris(trimethylsilyl)silane and bis(trimethylsilyl)methane.

7. Process according to claim 1, characterized in that, in phase a) the vapour of the said compound is entrained by an inert gas.

8. Process according to claim 7, characterized in that phase a) is carried out at a temperature above the boiling point of the said compound.

9. Process according to claim 1, characterized in that phase a) is carried out at a temperature of between 30 and 140° C. and at a pressure of between 0 and 3 bar.

10. Process according to claim 1, characterized in that phase b) is carried out in the presence of a combustible gas and an excess of oxygen.

11. Process for producing a high-purity optical silica preform, comprising:
   a) vaporization of an organosilicon compound;
   b) thermal decomposition of the said organosilicon compound in the vapour state and in the presence of oxygen by a combustion process to give amorphous fused silica particles, where the ratio of said oxygen to said organosilicon compound is from 5:1 to 20:1;
   c) deposition of the said amorphous fused silica particles on a support to form the high purity optical silica preform; and characterized in that
the said organosilicon compound has the following formula

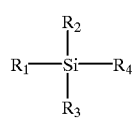
(I)

in which
   $R_1$, $R_2$ and $R_3$ are each, independently, hydrogen, methyl, ethyl, propyl, isopropyl or a group of formula —Si—($R_5$ $R_6$ $R_7$), where $R_5$, $R_6$ and $R_7$ are each, independently, methyl, ethyl, propyl or isopropyl, and
   $R_4$ is a group of formula —$(CH_2)_m$—Si—$R_5$ $R_6$ $R_7$), where $R_5$, $R_6$ and $R_7$ are as defined above and m is an integer between 0 and 3.

12. Process according to claim 11, characterized in that at least two of the groups $R_1$, $R_2$ and $R_3$ are other than hydrogen.

13. Process according to claim 11, characterized in that the said compound is liquid at room temperature.

14. Process according to claim 11, characterized in that the said compound has a boiling point of less than about 140° C.

15. Process according to claim 11, characterized in that the said compound has a boiling point of between about 70° C. and about 140° C.

16. Process according to claim 11, characterized in that the said compound is chosen from the group comprising hexamethyldisilane, tris(trimethylsilyl)silane and bis(trimethylsilyl)methane.

17. Process according to claim 11, characterized in that, in phase a) the vapour of the said compound is entrained by an inert gas.

18. Process according to claim 17, characterized in that phase a) is carried out at a temperature above the boiling point of the said compound.

19. Process according to claim 11, characterized in that phase a) is carried out at a temperature of between 30 and 140° C. and at a pressure of between 0 and 3 bar.

* * * * *

UNITED STATES PATENT AND TRADEMARK OFFICE
CERTIFICATE OF CORRECTION

PATENT NO.    : 6,336,347 B1
DATED         : January 8, 2002
INVENTOR(S)   : Giacomo Stefano Roba and Marco Arimondi Page 1 of 1

It is certified that error appears in the above-identified patent and that said Letters Patent is hereby corrected as shown below:

<u>Column 8,</u>
Line 1, "-$(CH_2)_m$-Si-$R_5R_6R_7$)" should read -- -$(CH_2)_m$-Si-$(R_5R_6R_7)$ --.

Signed and Sealed this

Twenty-first Day of May, 2002

Attest:

Attesting Officer

JAMES E. ROGAN
*Director of the United States Patent and Trademark Office*